United States Patent
Sugano

(10) Patent No.: US 11,374,747 B2
(45) Date of Patent: Jun. 28, 2022

(54) VEHICULAR SYSTEM FOR PROCESSING ENCRYPTION KEY AND ELECTRONIC CONTROL DEVICE

(71) Applicant: DENSO CORPORATION, Kariya (JP)

(72) Inventor: Yasuharu Sugano, Kariya (JP)

(73) Assignee: DENSO CORPORATION, Kariya (JP)

( * ) Notice: Subject to any disclaimer, the term of this patent is extended or adjusted under 35 U.S.C. 154(b) by 308 days.

(21) Appl. No.: 16/663,225

(22) Filed: Oct. 24, 2019

(65) Prior Publication Data

US 2020/0059359 A1 Feb. 20, 2020

Related U.S. Application Data

(63) Continuation of application No. PCT/JP2018/011269, filed on Mar. 22, 2018.

(30) Foreign Application Priority Data

May 16, 2017 (JP) .............................. JP2017-097107

(51) Int. Cl.
*H04L 9/14* (2006.01)
*H04L 9/08* (2006.01)

(52) U.S. Cl.
CPC .......... *H04L 9/0891* (2013.01); *H04L 9/0819* (2013.01); *H04L 9/0894* (2013.01); *H04L 9/14* (2013.01)

(58) Field of Classification Search
CPC ... H04L 9/0891; H04L 9/0819; H04L 9/0894; H04L 9/14; H04L 2209/84
See application file for complete search history.

(56) References Cited

U.S. PATENT DOCUMENTS

| 2006/0115085 A1* | 6/2006 | Iwamura | H04L 9/0891 380/259 |
| 2007/0287415 A1 | 12/2007 | Yamada | |
| 2010/0106967 A1* | 4/2010 | Johansson | H04W 12/04 713/158 |
| 2011/0320089 A1* | 12/2011 | Lewis | H04W 12/041 701/29.6 |
| 2013/0173112 A1* | 7/2013 | Takahashi | H04W 12/04 701/36 |
| 2016/0315766 A1* | 10/2016 | Ujiie | H04L 63/0428 |

(Continued)

FOREIGN PATENT DOCUMENTS

| JP | 2005341528 A | 12/2005 |
| JP | 2007280021 A | 10/2007 |
| JP | 2009182897 A | 8/2009 |

(Continued)

*Primary Examiner* — Khoi V Le
(74) *Attorney, Agent, or Firm* — Harness, Dickey & Pierce, P.L.C.

(57) ABSTRACT

A vehicular system includes a first electronic control device that manages an encryption key, and a second electronic control device that uses the encryption key. The first electronic control device is configured to create the encryption key in response to that an owner of a vehicle has changed, and output the encryption key to the second electronic control device. The second electronic control device is configured to store a first encryption key and a third encryption key, receive a second encryption key, switch the encryption key being used, and update the first encryption key to the second encryption key.

8 Claims, 5 Drawing Sheets

(56) References Cited

U.S. PATENT DOCUMENTS

2018/0012433 A1* 1/2018 Ricci .................... B60R 25/102

FOREIGN PATENT DOCUMENTS

| JP | 2013138320 A | 7/2013 |
| JP | 201636159 A | 3/2016 |
| JP | 201692811 A | 5/2016 |
| WO | WO-2016075869 A1 | 5/2016 |

* cited by examiner

| KEY | USAGE STATE |
|---|---|
| ENCRYPTION KEY K1 | ○ |
| ENCRYPTION KEY K2 | ~ |

| KEY | USAGE STATE |
|---|---|
| ENCRYPTION KEY K1 | ~ |
| ENCRYPTION KEY K2 | ○ |

| KEY | USAGE STATE |
|---|---|
| ENCRYPTION KEY K1 | ~ |
| ENCRYPTION KEY K2 | ○ |

VEHICULAR SYSTEM FOR PROCESSING ENCRYPTION KEY AND ELECTRONIC CONTROL DEVICE

CROSS-REFERENCE TO RELATED APPLICATION

The present application is a continuation application of International Patent Application No. PCT/JP2018/011269 filed on Mar. 22, 2018 which designated the U.S. and claims the benefit of priority from Japanese Patent Application No. 2017-97107 filed on May 16, 2017. The entire disclosures of all of the above applications are incorporated herein by reference.

TECHNICAL FIELD

The present disclosure relates to processing of an encryption key for securing security and in particular, to processing of an encryption key used by an electronic control device mainly configuring a vehicular system.

BACKGROUND

A communication device mounted on an automobile receives and transmits various information through a network.

SUMMARY

The present disclosure describes a vehicular system includes a first electronic control device that manages an encryption key, and a second electronic control device that uses the encryption key.

BRIEF DESCRIPTION OF DRAWINGS

The above and other aspects, features and advantages of the present disclosure will become more apparent from the following detailed description made with reference to the accompanying drawings. In the drawings:

FIG. 6A illustrates a usage state of encryption keys used by the vehicle control device according to the first embodiment;

FIG. 6B illustrates the usage state of the encryption keys used by the vehicle control device according to the first embodiment;

FIG. 6C illustrates the usage state of the encryption keys used by the vehicle control device according to the first embodiment.

DETAILED DESCRIPTION

Figure 1:
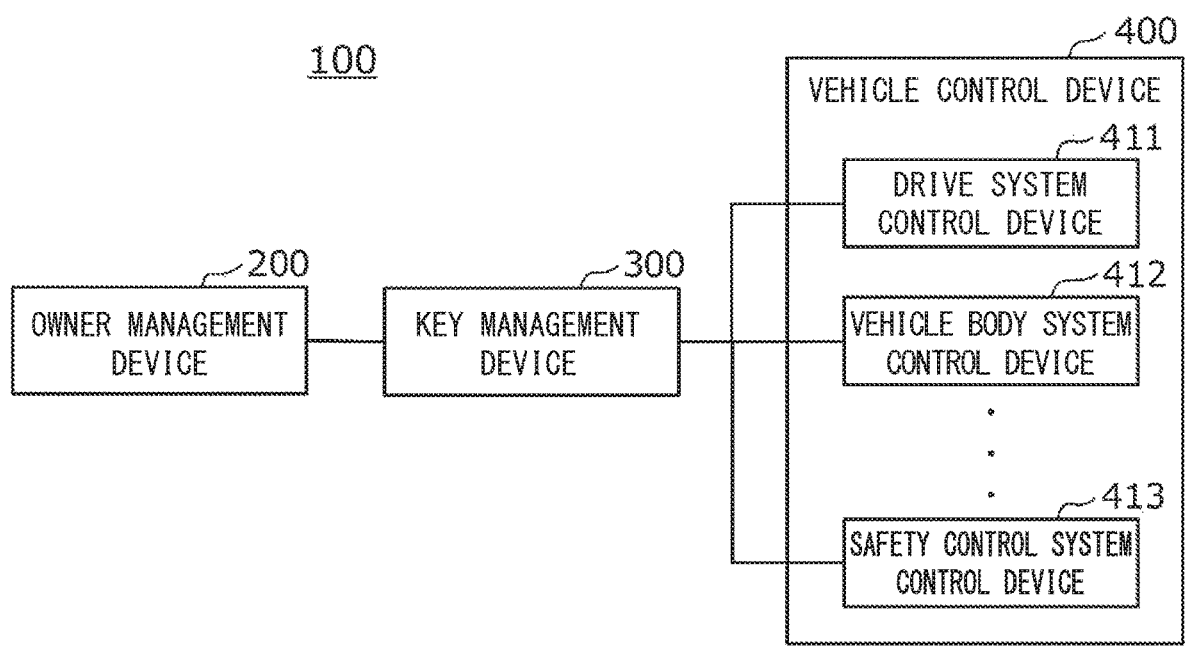
FIG. 1 is a block diagram of a configuration of a vehicular system according to a first embodiment.

A communication device mounted on an automobile receives and transmits various information through a network. In recent years, according to the progress of wireless communication, the technology of collecting and analyzing the state of vehicles or roads acquired from in-vehicle sensors through the network and automated driving vehicles that receive and transmit commands through the network to control their travel may have been actively developed.

When an automobile is connected to the network, an in-vehicle device may be affected by unauthorized access from a network outside the automobile. In particular, an need for ensuring the security of an ECU that controls an operation of a drive mechanism in a vehicle for the purpose of achieving the traveling safety of an automobile may be increased.

A related art describes a technology of enhancing the security of an automobile by creating and managing an encryption key used in the automobile and periodically updating the encryption key through a key management system that includes a management device mounted on the automobile and a key management server device that is managed by an automobile manufacturer and performs wireless communication with the management device on an automobile side.

Automobiles are bought and sold on the used market more frequently than domestic appliances. It is common that the owners of automobiles change. In some cases, the users of automobiles may frequently change in car rental and car sharing, for example. If a malicious owner of an automobile or a temporary malicious user of an automobile analyzes an ECU in a vehicle and obtains an encryption key used for ensuring the integrity of messages and data protection, the vehicle used by the next owner or user may be illegally accessed from the old owner or other persons and the ECU may be illegally operated through the insertion of illegal messages.

The present disclosure describes a vehicular system that ensures security by changing an encryption key used in an automobile to a new encryption key when the owner of the automobile has changed, a method, a program, a non-transitory tangible computer readable medium relating thereof.

According to one aspect of the present disclosure, a vehicular system may include: a first electronic control device that manages an encryption key, and a second electronic control device that uses the encryption key. The first electronic control device may include a key creation section that creates the encryption key in response to that an owner of a vehicle including the first electronic control device and the second electronic control device has changed, and a key distribution section that outputs the encryption key to the second electronic control device. The second electronic control device may include a key holding portion that stores a first encryption key that is the encryption key being used, a key receiver that receives a second encryption key that is the encryption key output from the key distribution section, and a key update section that updates the first encryption key stored in the key holding portion to the second encryption key.

According to another aspect of the present disclosure, an electronic control device is communicable with a different device using an encryption key stored in a storage portion. The electronic control device may include: a key creation section that creates an encryption key in response to that an owner of a vehicle including the electronic control device has changed; and a key distribution section that outputs the encryption key to the different device updating an encryption key stored in an storage portion in response to that the different device has received the encryption key.

According to another aspect of the present disclosure, an electronic control device uses an encryption key, and is communicable with a different device creating the encryption key in response to that an owner of a vehicle has changed. The electronic control device may include: a key holding portion that stores a first encryption key that is an encryption key being used; a key receiver that receives a second encryption key from the different device; and a key update section that updates the first encryption key stored in the key holding portion to the second encryption key.

According to another aspect of the present disclosure, an encryption key creation and update method is performed in a vehicular system including a first electronic control device that manages an encryption key and a second electronic control device that uses the encryption key. The encryption key creation and update method may include: in the first electronic control device, creating an encryption key in response to that an owner of a vehicle including the first electronic control device and the second electronic control device has changed, and outputting the encryption key from a key distribution section of the first electronic control device to the second electronic control device; and in the second electronic control device, receiving a second encryption key that is the encryption key output from the key distribution section, and updating a first encryption key that is an encryption key being used stored in a key holding portion of the second electronic control device to the second encryption key.

According to another aspect of the present disclosure, an encryption key creation method is performed in an electronic control device communicable with a different device using an encryption key stored in a storage portion. The encryption key creation method may include: creating an encryption key in response to that an owner of a vehicle including the electronic control device has changed; and outputting the encryption key to the different device that updates an encryption key stored in the storage portion in response to that the encryption key has been received.

According to another aspect of the present disclosure, an encryption key update method is performed in an electronic control device that is communicable with a different device creating the encryption key in response to that an owner of a vehicle has changed and that uses an encryption key. The encryption key update method may include: receiving a second encryption key from the different device; and updating a first encryption key that is an encryption key being used stored in a key holding portion to the second encryption key.

Further, according to another aspect of the present disclosure, a program executing an encryption key creation and update method, an encryption key creation method, or an encryption key update method may be provided.

According to the present disclosure, when the owner of a vehicle has changed, an encryption key used in an automobile is changed to a new encryption key, so that security is ensured.

Embodiments for carrying out the present disclosure will be described below with reference to the drawings.

First Embodiment

FIG. 1 illustrates a configuration of a vehicular system 100 according to a first embodiment. The vehicular system 100 of the present disclosure includes an owner management device 200, a key management device 300, and multiple vehicle control devices 400. The owner management device 200, the key management device 300, and the vehicle control devices 400 are an electronic control device (ECU) for a vehicle. The owner management device 200 is connected to the key management device 300 through an in-vehicle network. The key management device 300 is connected to each of the vehicle control devices 400 through an in-vehicle network. The owner management device 200 corresponds to a third electronic control device of the present disclosure. The key management device 300 corresponds to a first electronic control device of the present disclosure. The vehicle control devices 400 each corresponds to a second electronic control device of the present disclosure.

In the first embodiment, the owner management device 200 is configured as a vehicular system mounted on a vehicle. However, the owner management device 200 may be a vehicle-outside server to perform wired or wireless communication with the key management device 300. In addition, when the owner management device 200 and the key management device 300 are configured as a single electronic control device, the electronic control device including the functions of the owner management device 200 and the key management device 300 may be configured as the vehicle-outside server.

While the following description describes the vehicular system 100, the following description includes descriptions of electronic control devices constituting the vehicular system 100. Note that the first electronic control device, the second electronic control device, and the third electronic control device of the present disclosure are separated in a functional point of view and are not necessarily separated physically. Other devices in the present disclosure correspond to other electronic control devices as viewed from each electronic control device.

The expression "vehicular" in the present disclosure may include a device mounted on a vehicle in advance, a device retrofitted to a vehicle, and a device that outputs signals to an electronic control device mounted on a vehicle such as a vehicle-outside server and an electronic control device used by a dealer.

The configuration and function of the owner management device 200, the key management device 300, and the vehicle control devices 400 will be described below.

(Owner Management Device)

Figure 2:
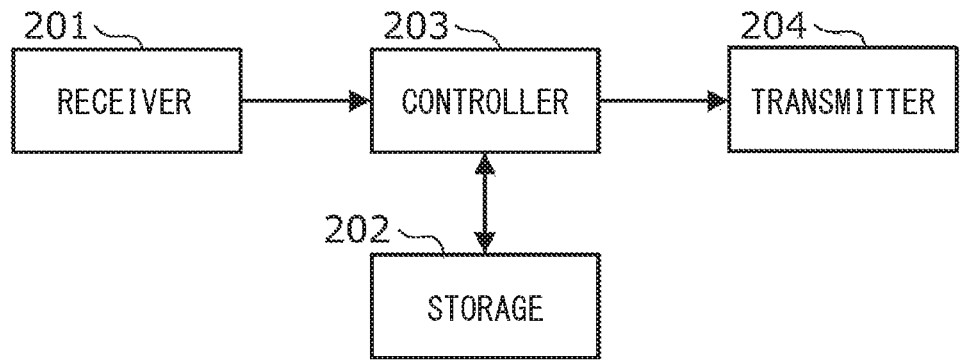
FIG. 2 is a block diagram of a configuration of an owner management device according to the first embodiment.

The owner management device 200 is an electronic control device that manages information about the owner of a vehicle. As illustrated in FIG. 2, the owner management device 200 includes a receiver 201, a storage portion 202, a controller 203, and a transmitter 204. The owner management device 200 corresponds to the third electronic control device of the present disclosure or an electronic control device.

The receiver 201 receives new owner information about the owner of the vehicle. The owner information includes personal information about the owner of the vehicle input through an interface such as a car navigation system installed in a vehicle or wireless communication, such as a name, an address, a telephone number, a mail address, and a driving position. When receiving the owner information, the receiver 201 inputs the owner information to the controller 203. The new owner information about the owner of the vehicle corresponds to update information of the present disclosure.

The expression "owner" in the present disclosure includes the owner of the vehicle and the temporary user of the vehicle. The information about the owner includes information for identifying the owner and information related to the owner such as the attribute and identification number of the owner. Similarly, old information about the old owner to be described below includes not only information itself for identifying the old owner but also information related to the attribute and identification number of the old owner.

The storage portion 202 stores the owner information input to the receiver 201 in addition to the owner information of the old owner, which is originally stored in the storage portion 202. The owner information stored in the storage portion 202 can be written, read, or deleted in response to instructions from the controller 203. The storage portion 202 is composed of, for example, an non-volatile memory such as an EEPROM (electrically erasable programmable read-only memory), a flash ROM, and a hard disk. The owner information of the old owner that is originally stored corresponds to old information of the present disclosure.

When new owner information is input via the receiver 201 to the controller 203, the controller 203 reads the owner information of the old owner stored in the storage portion 202, compares the owner information to the new owner information, and determines whether the owner of the vehicle has changed.

When it is determined that the owner of the vehicle has changed as a result of comparing the new owner information to the owner information read from the storage portion 202, the controller 203 inputs owner change information indicating that the owner has changed to the transmitter 204. In addition, the controller 203 outputs a signal to instruct the storage portion 202 to store the new owner information.

The transmitter 204 outputs the owner change information to the key management device 300, thus notifying the key management device 300 that the owner has changed.

The reference for determining whether the owner of the vehicle has changed may be freely set. For example, when changed information is the name of the owner, the controller 203 may determine that the owner has changed. The address, telephone number, and mail address of the same owner may be changed. When two or more pieces of the information are changed, the controller 203 may determine that the owner has changed. The reference for determining whether the owner has changed is not limited to this example.

(Key Management Device)

Figure 3:
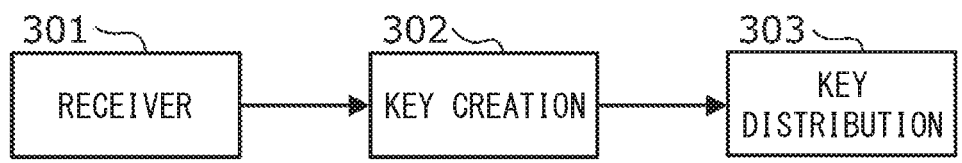
FIG. 3 is a block diagram of a configuration of a key management device according to the first embodiment.

The key management device 300 is an electronic control device that manages an encryption key used by the vehicle control devices 400 for the purpose of enhancing security by ensuring the integrity of messages and data protection. As illustrated in FIG. 3, the key management device 300 includes a receiver 301, a key creation section 302, and a key distribution section 303. The key management device 300 corresponds to the first electronic control device of the present disclosure or an electronic control device.

The receiver 301 receives owner change information indicating that the owner of a vehicle has changed from the transmitter 204 of the owner management device 200.

When it is determined that the receiver 301 has received the owner change information, the key creation section 302 creates a 128-bit encryption key, for example. The key creation section 302 then outputs the created encryption key via the key distribution section 303 to the vehicle control device 400.

The expression "case" in the present disclosure includes a case where an encryption key is created immediately after receiving the owner change information and a case where an encryption key is created when other conditions are further satisfied.

(Vehicle Control Device)

Figure 4:
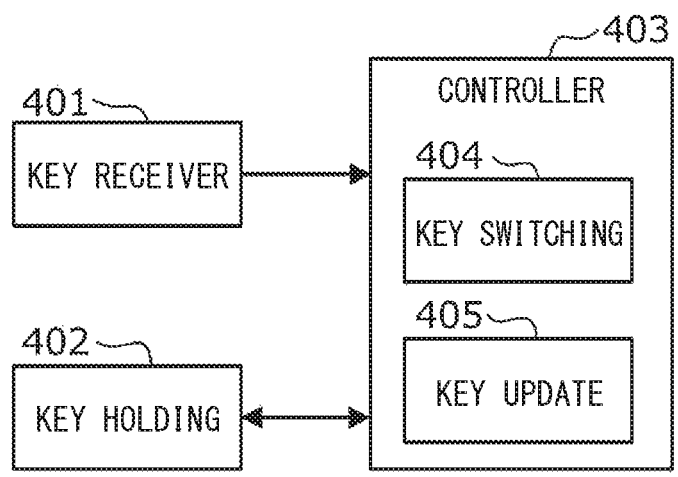
FIG. 4 is a block diagram of a configuration of a vehicle control device according to the first embodiment.

The vehicle control device 400 is an electronic control device that controls a mechanism including an engine mounted on a vehicle by a program to perform a desired operation. As illustrated in FIG. 4, the vehicle control device 400 includes a key receiver 401, a key holding portion 402, and a controller 403. The controller 403 includes a key switching section 404 and a key update section 405. As illustrated in FIG. 1, the vehicle control device 400 includes a drive system control device 411 that controls a drive mechanism, a vehicle body system control device 412 that controls opening and closing of doors, a safety control system control device 413 that controls an operation of an airbag, and any other control devices. The vehicle control device 400 corresponds to the second electronic control device of the present disclosure or an electronic control device.

The key receiver 401 receives an encryption key from the key distribution section 303 of the key management device 300. The newly received encryption key is input to the controller 403. The newly received encryption key corresponds to a second encryption key of the present disclosure.

The key holding portion 402 stores encryption keys used for encrypting and decrypting programs and data for controlling a mechanism such as an engine. The key holding portion 402 desirably stores two encryption keys. One of the two encryption keys is an encryption key K1 that is currently used. The other is an encryption key K2 that is not used currently but will be used after the encryption key K1 being currently used. The key holding portion 402 is composed of, for example, an non-volatile memory such as an EEPROM, a flash ROM, and a hard disk. The encryption key K1 corresponds to a first encryption key of the present disclosure. The encryption key K2 corresponds to a third encryption key of the present disclosure.

Initial encryption keys K1 and K2 stored in the key holding portion 402 of a new vehicle are written at a vehicle manufacturing factory or an ECU manufacturing factory before the vehicle is shipped from the factory.

When it is determined that the key receiver 401 has received a new encryption key, the key switching section 404 of the controller 403 switches an encryption key to be used from the encryption key K1 being currently used to the encryption key K2.

The expression "case" in the present disclosure includes a case where the encryption key is switched immediately when the second encryption key is received and a case where the encryption key is switched after a predetermined period of time elapses.

The key update section 405 of the controller 403 overwrites the encryption key K1 stored in the key holding portion 402 with the new encryption key K3 input from the key receiver 401, thus updating the encryption keys stored in the key holding portion 402.

The present embodiment describes an example in which the key holding portion 402 stores two encryption keys. However, the key holding portion 402 may store only one encryption key K1. In a case where the key holding portion 402 stores only the encryption key K1, when the key receiver 401 receives the encryption key K3 from the key distribution section 303, the encryption key to be used is switched from the encryption key K1 to the encryption key K3 and then the encryption key to be stored in the key holding portion 402 is updated from K1 to K3.

The key update section 405 may update an encryption key at any timing. However, the storage area must be reliably overwritten according to the update of the encryption key.

When the storage area is overwritten while a vehicle is traveling, the owner may switch off the ignition halfway of an overwrite process, for example. As a result, when the encryption key K1 is overwritten and updated with the encryption key K3, a mistake of overwriting may occur. In view of the above description, the encryption key is desirably updated while the key holding portion 402 operates stably, for example, when the ignition of the vehicle is switched on from off.

The case where an ignition is switched on from off in the present disclosure includes a case where the ignition is switched on in a gasoline car and a case where the power switch of an electric car or a hybrid car is switched on.

An operation of vehicular system 100 according to the present disclosure will be described with reference to FIGS. 5, 6A, 6B, and 6C.

Figure 5:
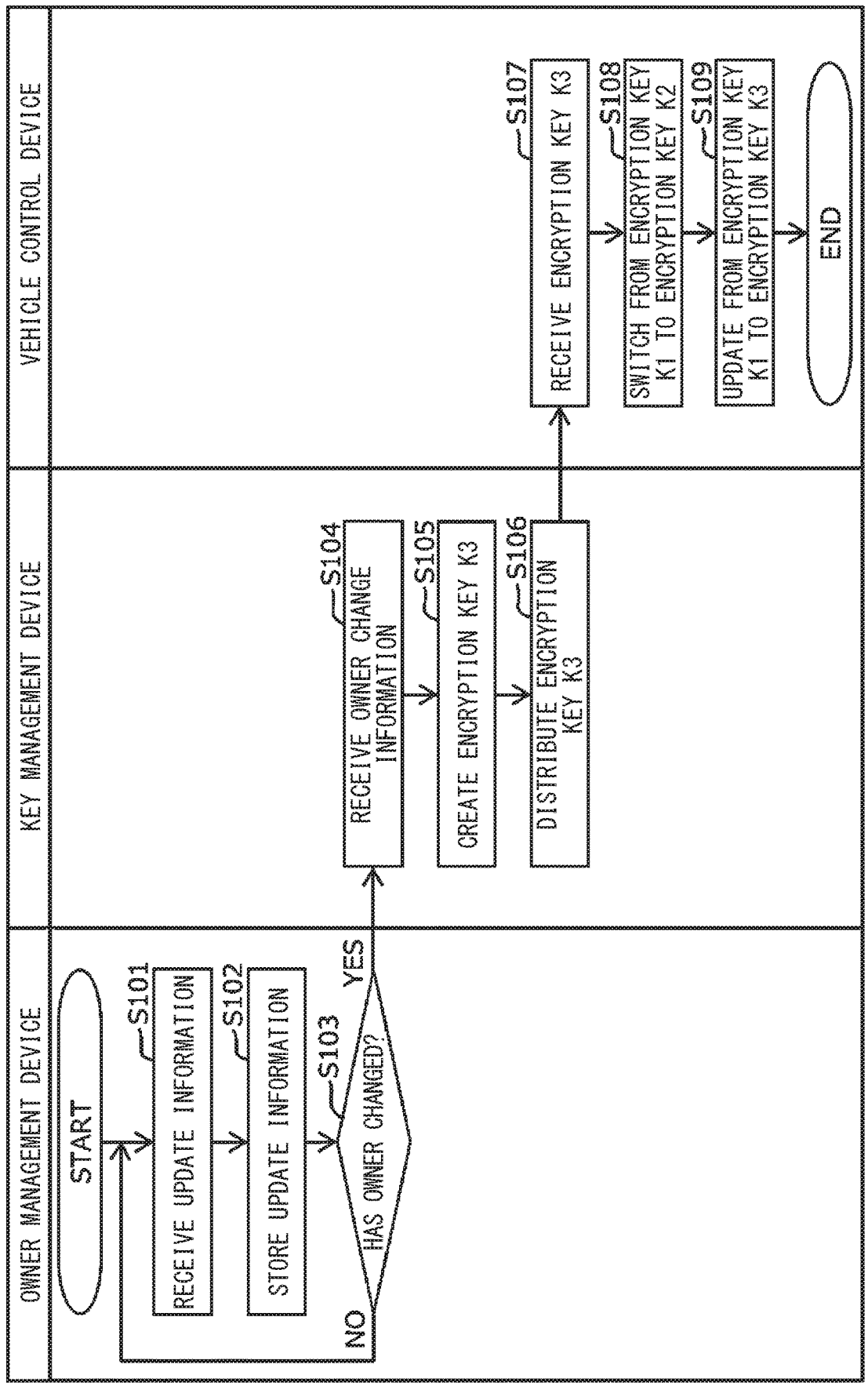
FIG. 5 is a flowchart illustrating an operation of the vehicular system according to the first embodiment.

FIG. 5 is a flowchart illustrating a series of operations performed by the vehicular system 100 from when new owner information is input to when an encryption key is updated. FIGS. 6A, 6B, and 6C illustrate encryption keys stored in the vehicle control device 400 and the usage state of an encryption key to be used. FIG. 6A illustrates the usage state of encryption keys at S101 to S107. FIG. 6B illustrates the usage state of the encryption keys at S108. FIG. 6C illustrates the usage state of the encryption keys at S109.

When new owner information is input through an interface, the receiver 201 of the owner management device 200 receives at S101 the new owner information as update information and the update information is stored in the storage portion 202 at S102. At S103, the controller 203 of the owner management device 200 compares the owner information stored in the storage portion 202 to the update information to determine whether the owner of a vehicle has changed. When it is determined that the owner of the vehicle has changed, the owner management device 200 outputs owner change information indicating that the owner has changed to the key management device 300.

When the key management device 300 receives the owner change information from the owner management device 200 at S104, the key creation section 302 creates the encryption key K3 at S105. At S106, the created encryption key K3 is distributed from the receiver 301 to the vehicle control device 400 through an in-vehicle network.

Next, when the vehicle control device 400 receives the encryption key K3 from the key management device 300 at S107, the currently used encryption key is switched from the encryption key K1 to the encryption key K2 at S108.

As illustrated in FIG. 6A, while the processes are performed at S101 to S107, the vehicle control device 400 uses the encryption key K1 as the encryption key. As illustrated in FIG. 6B, with the process at S108, the encryption key being used changes to the encryption key K2.

The vehicle control device 400 switches the encryption key from the encryption key K1 to the encryption key K2 at S108 and then at S109, updates the encryption key K1 to the encryption key K3 received at S107, as illustrated in FIG. 6C.

The processing illustrated in FIG. 5 is performed every time new owner information is input. Consequently, when new owner information is input again to the interface or the like and the owner management device 200 determines that the owner has changed, the key management device 300 creates a new encryption key K4 and distributes the encryption key K4 to the vehicle control device 400 based on the processing illustrated in FIG. 5. The vehicle control device 400 switches the encryption key to be used from the encryption key K2 to the encryption key K3 and then updates the encryption key K2 to the encryption key K4 received from the key management device 300.

In the present embodiment, the owner management device 200 and the key management device 300 are configured as different electronic control devices. However, the owner management device 200 and the key management device 300 may be configured as a single electronic control device including the functions of these devices. The owner management device is also referred to as "owner information management device".

In this case, S104 of FIG. 5 is omitted. When the controller determines that the owner of the vehicle has changed, the key creation section creates a new encryption key.

The expression "case" in the present disclosure includes a case where an encryption key is created immediately when it is determined that the owner has changed and a case where an encryption key is created when other conditions are further satisfied.

In a case where the key holding portion 402 stores only the encryption key K1, when the vehicle control device 400 receives the encryption key K3 at S107, the currently used encryption key is switched from the encryption key K1 to the encryption key K3 at S108. At S109, the encryption key stored in the key holding portion 402 is updated from the encryption key K1 to the encryption key K3.

According to the first embodiment, when the owner of the vehicle has changed, the encryption key used by the vehicle control device is updated. It may be possible to ensure the security against unauthorized access to the vehicular system by the old owner.

(First Modification)

In the first embodiment, the controller 203 of the owner management device 200 compares owner information stored in the storage portion 202 to update information that is new owner information to determine whether the owner has changed. However, the controller 203 may determine whether the owner has changed by methods other than the comparison described above.

For example, whenever new owner information is input and the receiver 201 of the owner management device 200 receives the new owner information as update information, the controller 203 may determine that the owner has changed. Alternatively, when the storage portion 202 is initialized through an interface or the like, the controller 203 may determine that the owner has changed. The case where the storage portion 202 is initialized may include a case where the owner information is deleted.

According to the present modification, when the owner of a vehicle may have changed, the encryption key is updated. It may be possible to ensure higher security.

Second Embodiment

In the first embodiment, when the controller 203 of the owner management device 200 determines that the owner has changed based on update information, owner change information indicating that the owner has changed is automatically input to the key management device 300. However, in some cases such as a case where the address is changed by moving, even if new owner information is input, the owner of a vehicle does not change.

In a second embodiment, when new owner information is input, the owner management device 200 asks the owner of a vehicle whether the encryption key is updated, that is to say, the necessity of update. The encryption key is updated only if needed.

The expression "ask (owner) necessity of update" in the present disclosure is not limited to a case of directly asking the owner whether the encryption key is updated. The owner may be indirectly asked about the content by which an electronic control device is capable of determining whether the encryption key needs to be updated, for example, whether the owner has changed or whether the security of a system is reset.

Figure 7:
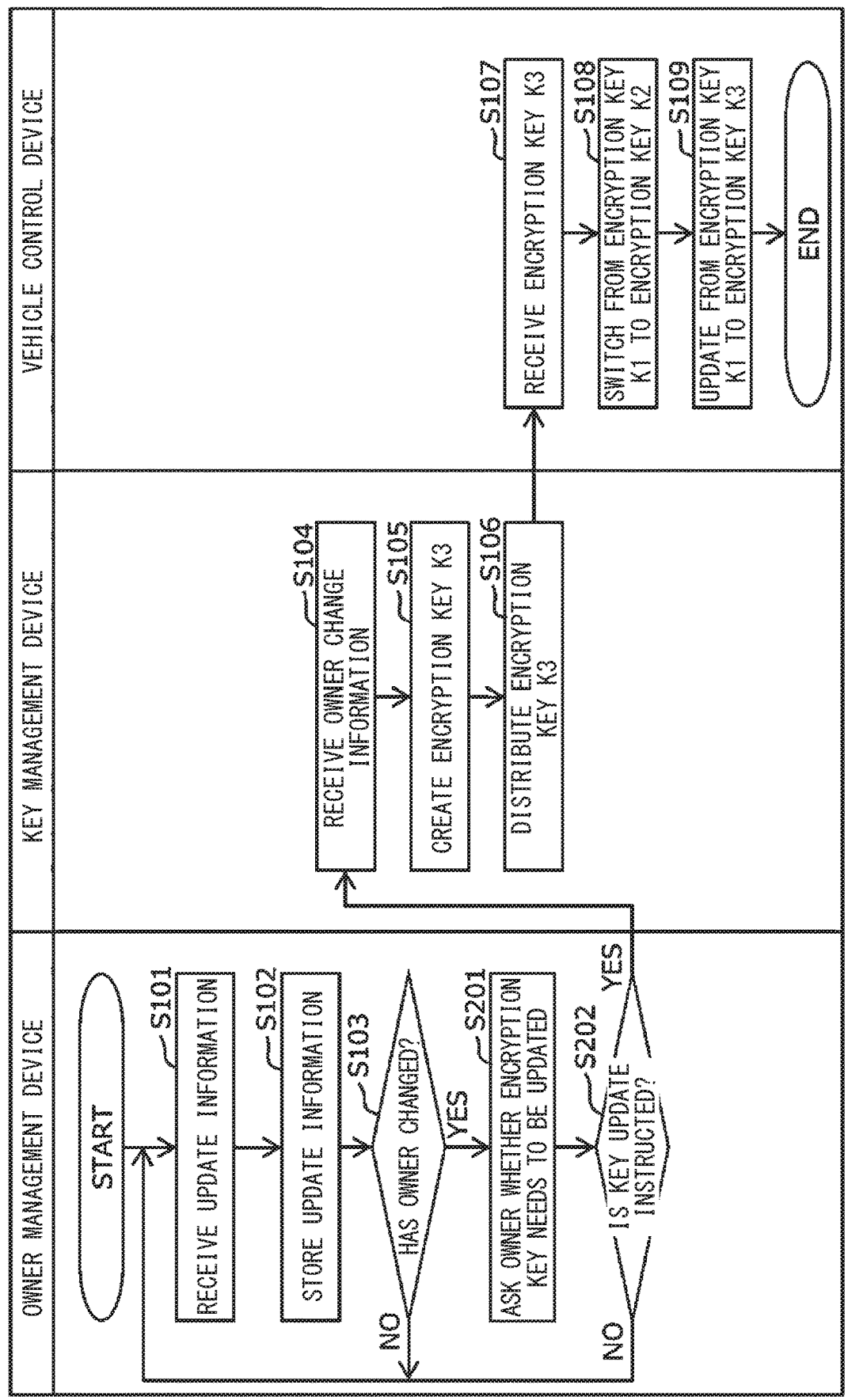
FIG. 7 is a flowchart illustrating an operation of a vehicular system according to a second embodiment.

An operation of a vehicular system according to the second embodiment will be described with reference to FIG. 7. The detailed description of parts common to the first embodiment will be omitted. The differences from the first embodiment will be mainly described.

As in the first embodiment, when receiving information about the new owner of a vehicle as update information through an interface or the like, the controller 203 of the owner management device 200 according to the second embodiment determines at S103 whether the owner has changed. When the controller 203 determines at S103 that the owner has changed with high possibility based on the input update information, a message "Do you want to update security of vehicle? (Yes/No)" is displayed on an in-vehicle interface at S201 to ask the owner of the vehicle whether the encryption key is updated. When the owner of the vehicle selects Yes at S202, the controller 203 outputs the owner change information indicating that the owner has changed to the key management device 300. The key management device 300 having received the owner change information creates the encryption key K3 as in the first embodiment.

In the second embodiment, the owner management device 200 asks the owner of the vehicle whether the encryption key needs to be updated, and outputs owner change information to the key management device 300 in response to an instruction to update the encryption key. However, instead of the owner management device 200, the key management device 300 may ask the owner of the vehicle whether the encryption key needs to be updated and receive an instruction to update the encryption key.

In this case, when the owner management device 200 determines at S103 that the owner of the vehicle has changed, and the owner change information is output to the key management device 300, the key management device 300 displays a message for asking the owner of the vehicle whether the encryption key needs to be updated on the interface. When the receiver 301 of the key management device 300 receives the instruction to update the encryption key from the owner of the vehicle, the key management device 300 creates the encryption key K3.

As described above, according to the second embodiment, it is possible to reliably update an encryption key only when the owner of the vehicle has changed.

(Second Modification)

The second embodiment is configured as follows. That is, when the controller 203 of the owner management device 200 determines that the owner has changed with high possibility, a message as to whether the encryption key needs to be updated is displayed on an interface, and the owner management device 200 receives an instruction as to whether the encryption key needs to be updated from the owner of a vehicle. However, even if the controller 203 does not determine that the owner of the vehicle has changed, the owner of the vehicle may input a change of the owner of the vehicle from the interface at any timing. The case where the change of the owner of the vehicle is input from the interface is also included in the case where the owner of the vehicle has changed.

According to the present modification, even if the owner of the vehicle does not change as in car rental and car sharing, the encryption key can be manually updated every time the user changes. As a result, it is possible to prevent the previous user from illegally accessing the vehicle.

Other Embodiments

In the first embodiment and the second embodiment, when the owner management device 200 determines that the owner of a vehicle has changed, the key management device 300 creates a new encryption key and outputs the new encryption key to the vehicle control device 400, and the vehicle control device 400 updates the encryption key being used. However, the encryption key is not necessarily created in a vehicular system.

For example, when the owner management device 200 determines that the owner of a vehicle has changed, the controller 203 may notify the owner of the vehicle that security needs to be updated. The owner having received the notification may take the vehicle to a dealer to update the encryption key.

The expression "vehicular" in the present disclosure may include a device mounted on a vehicle in advance, a device retrofitted to a vehicle, and a device that outputs signals to an electronic control device mounted on a vehicle such as a vehicle-outside server and an electronic control device used by a dealer. The vehicular system according to the present disclosure includes a system composed of an electronic control device mounted on a vehicle and a system in which a part of the electronic control device in the system is provided outside the vehicle. S105, S106, S107, and S109 correspond to an example of an encryption key creation and update method according to the present disclosure. S105 and S106 correspond to an example of an encryption key creation method according to the present disclosure. S107 and S109 correspond to an example of an encryption key update method according to the present disclosure.

The vehicular system and the electronic control device including the owner management device, the key management device, and the vehicle control device have been described in the embodiments of the present disclosure.

The operation of the electronic control device in the embodiments has been described also as a method, with reference to the block diagrams and the flowcharts. The method is achieved not only by the objects described above but also by a combination of a program recorded in a non-transitory tangible recording medium (also referred to as "non-transitory computer-readable storage medium") such as a RAM, ROM, a flash memory (hereinafter, "memory"), and a recording medium such as a hard disk and a microcomputer including a dedicated or general purpose CPU for executing the program and a memory. The program may be provided not from the recording medium but from a server via a communication line. Consequently, as the program is upgraded, the latest function is always provided. Only one microcomputer may be provided, or multiple microcomputers may be provided.

The vehicular system and the electronic control device according to the present disclosure are mainly used to ensure the security of an automobile. However, the vehicular system and the electronic control device may be used to ensure the security of vehicles other than the automobile, for example, a motorcycle, a power-assisted bicycle, a ship, and an airplane. Moreover, the present disclosure is not limited to these applications. In the present disclosure, the electronic control device may be communicable with other devices that use or create an encryption key.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of a vehicular system for processing encryption key and an electronic control device according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claim is:

1. A vehicular system comprising:
a first electronic control device that manages an encryption key; and
a second electronic control device that uses the encryption key, wherein:
the first electronic control device is configured to
create the encryption key in response to an owner change of a vehicle including the first electronic control device and the second electronic control device, and
output the encryption key to the second electronic control device; and the second electronic control device is configured to
store a first encryption key that is the encryption key currently being used and a third encryption key that uses next in a key holding portion of the second electronic control device,
receive, with a key receiver of the second electronic control device, a second encryption key that is the encryption key output from the first electronic control device in response to the owner change,
switch, with a key switching section of the second control device, the currently used encryption key from the first encryption key to the third encryption key in response to the second electronic control device receiving the second encryption key,
switch, with the key switching section of the second control device, a next encryption key from the third encryption key to the second encryption key in response to the key receiver receiving the second encryption key, and
update the first encryption key to the second encryption key.

2. The vehicular system according to claim 1 further comprising:
a third electronic control device including:
a receiver that receives update information about an owner of the vehicle;
a storage that stores the update information;
a processor that determines that the owner of the vehicle has changed based on (i) reception of the update information, (ii) initialization of the storage, or (iii) a content of the update information and former information about an former owner further stored in the storage; and
a transmitter that notifies the first electronic control device that the owner has changed.

3. An electronic control device that uses an encryption key and that is communicable with a different device, the electronic control device comprising:
a key holding portion that stores a first encryption key that is an encryption key currently being used and a third encryption key that uses next to the first encryption key;
a key receiver that receives a second encryption key from the different device which creates the encryption key in response to an owner change of a vehicle;
a key switching section that switches the currently used encryption key from the first encryption key to the third encryption key in response to the second electronic control device receiving the second encryption keys;
the key switching section further switches a next encryption key from the third encryption key to the second encryption key in response to the key receiver receiving the second encryption key in response to the owner change of the vehicle; and
a key update section that updates the first encryption key stored to the second encryption key.

4. The electronic control device according to claim 3, wherein:
the key update section updates the first encryption key to the second encryption key in response to that an ignition of the vehicle is switched on from off.

5. An encryption key creation and update method that is performed in a vehicular system including a first electronic control device that manages an encryption key and a second electronic control device that uses the encryption key, the encryption key creation and update method comprising:
in the first electronic control device,
creating an encryption key in response to an owner change of a vehicle including the first electronic control device and the second electronic control device has changed, and
outputting the encryption key from a key distribution section of the first electronic control device to the second electronic control device;
in the second electronic control device,
receiving, with a key receiver of the second electronic control device, a second encryption key that is the encryption key output from the key distribution section in response the owner change of the vehicle,
switching, with a key switching section of the second electronic control device, the encryption key currently being used from a first encryption key stored in a key holding portion of the second electronic control device to a third encryption key that uses next and that is stored in the key holding portion of the second electronic control device,
switching, with the key switching section of the second electronic control device, a next encryption key from the third encryption key to the second encryption key in response to the key receiver of the second electronic control device receiving the second encryption key, and
updating the first encryption key that is an encryption key being used stored in the key holding portion of the second electronic control device to the second encryption key.

6. An encryption key update method that is performed in an electronic control device that uses an encryption key and that is communicable with a different device creating the encryption key in response to an owner change of a vehicle, the encryption key update method comprising:

receiving a second encryption key from the different device with a key receiver of the electronic control device in response to the owner change;

switching, with a key switching section of the electronic control device, the encryption key being used from a first encryption key that is currently being used and that is stored in a key holding portion of the electronic control device to a third encryption key stored in the key holding portion;

switching, with the key switching section of the electronic control device, a next encryption key from the third encryption key to the second encryption key in response to the key receiver of the electronic control device receiving the second encryption key; and updating the first encryption key that is an encryption key being used stored in the key holding portion to the second encryption key.

7. A non-transitory computer-readable storage medium that stores a program that executes an encryption key creation and update method performed in a vehicular system including a first electronic control device that manages an encryption key and a second electronic control device that uses the encryption key, the comprising:

a first program that executes, in the first electronic control device, creating the encryption key in response to an owner change of a vehicle including the first electronic control device and the second electronic control device, and outputting the encryption key from a key distribution section of the first electronic control device to the second electronic control device; and a second program that executes, in the second electronic control device, receiving, with a key receiver of the second electronic control device, a second encryption key that is the encryption key output from the key distribution section in response to the owner change, switching, with a key switching section of the second electronic control device, the encryption key currently being used from a first encryption key stored in a key holding portion of the second electronic control device to a third encryption key stored in the key holding portion of the second electronic control device, switching, with the key switching section of the second electronic control device, a next encryption key from the third encryption key to the second encryption key in response to the key receiver of the second electronic control device receiving the second encryption key, and updating the first encryption key that is an encryption key being used stored in the key holding portion of the second electronic control device to the second encryption key.

8. A non-transitory computer-readable storage medium that stores a program that executes an encryption key update method that is performed in an electronic control device that uses an encryption key and that is communicable with a different device creating the encryption key in response to an owner change of a vehicle, the program comprising:

receiving, with a key receiver of the electronic control device, a second encryption key from the different device in response to the owner change;

switching, with a key switching section of the electronic control device, the encryption key being used from a first encryption key that is currently being used and that is stored in a key holding portion of the electronic control device to a third encryption key that uses next and that is stored in the key holding portion;

switching, with the key switching section of the electronic control device, a next encryption key from the third encryption key to the second encryption key in response to the second encryption key being received with the key receiver; and updating the first encryption key that is an encryption key being used stored in the key holding portion to the second encryption key.

\* \* \* \* \*